United States Patent [19]

Kubo

[11] Patent Number: 4,704,181

[45] Date of Patent: Nov. 3, 1987

[54] APPARATUS FOR FABRICATING COMPUTER DISKS

[75] Inventor: Toyohide Kubo, Tokushima, Japan

[73] Assignee: AWA Engineering Co., Ltd., Tokushima, Japan

[21] Appl. No.: 896,288

[22] Filed: Aug. 13, 1986

[30] Foreign Application Priority Data

Aug. 20, 1985 [JP] Japan .................................. 60-183237

[51] Int. Cl.$^4$ .............................................. B32B 31/04
[52] U.S. Cl. ..................................... 156/423; 156/540; 156/541; 156/552; 156/556; 360/133; 360/135
[58] Field of Search ............... 156/249, 261, 262, 247, 156/293, 513, 514, 516, 518, 530, 540, 541, 552, 556, 423; 360/133, 135; 29/271

[56] References Cited

U.S. PATENT DOCUMENTS 4,613,392 9/1986 Klar et al. ............................. 156/556

Primary Examiner—Caleb Weston
Attorney, Agent, or Firm—Wenderoth, Lind & Ponack

[57] ABSTRACT

The disk is aligned by means of a centering device that passes through the disk center hole and possesses a recessed region in its tip which mates with the convex center region of the hub. The hub is held on a stand which is brought into close proximity with the centering device by the movement of either the stand or the centering device or both, thus bringing the hub close to the disk.

In other words, the centering device, which holds the disk in place by fitting through the disk center hole, is brought into close proximity with the stand which holds the hub in place. While in close proximity, the hub mates with the recession in the tip of the centering device, thereby achieving mechanical alignment. Since the disk position is accurately fixed with respect to the centering device, the disk is accurately aligned with the hub.

4 Claims, 5 Drawing Figures

APPARATUS FOR FABRICATING COMPUTER DISKS

BRIEF SUMMARY OF THE INVENTION

This invention primarily relates to machinery used in the fabrication of magnetic, laser, and other type of computer memory disks, and especially related to apparatus which accurately align and connect a central hub with these disks.

Incidentally, in this patent specification, the disk which is attached to the hub is either a magnetic, laser, or other type of memory disk; or else it is a disk of double sided tape (in the shape of a washer) which attaches the memory disk to the hub.

Subsequent explanations in this patent specification will assume the case where the disk is double sided tape. However, by applying bonding adhesive to the attachment surface (perimeter) of the hub, a memory disk can be aligned with and attached to that hub in the same manner.

A computer disk must be attached to a hub such that the disk center is accurately aligned with the hub center. In particular, the recent development of high density memory disks requires extremely accurate disk hub attachment. If the disk center and hub center are misaligned, the following problems can arise: a portion of the disk's inside perimeter attaches to the convex region of the hub, and causes the disk to warp and become nonplanar; uneven torque results in vibration; the hub does not bond tightly with the disk, and durability is degraded.

FIG. 5 shows the existing apparatus for attaching a disk of double sided tape 3 to a hub. In this apparatus, a protrusion on the upper surface of the hub stand 2 mates with the concave underside of the hub 1 to fix its position. The centering device 4 passes through the disk center hole and mates with the inside edge of the disk to fix its position. The hub stand is raised bringing the hub in proximity with disk, which is then pushed down on and attached to the hub. With this type of apparatus, it is difficult to perfectly align the center axes of the separately movable hub stand and centering device, which are separated by an incremental error (s). It is also easy for the disk to become misaligned when it is pushed down off the centering device. Hence, the difficulty in improving hub disk alignment accuracy with this type of apparatus is a serious drawback. The primary objecteve of this invention is to provide an apparatus for fabricating computer disks which was designed and developed to overcome this drawback by accurately attaching a disk to a hub.

The above and further objects and novel features of the invention will more fully appear from the following detailed description when the same is read in connection with accompanying drawing. It is to be expressly understood, however, that the drawing is for purposr of illustration only and is not intended as a definition of the limits of the invention.

BRIEF DESCRIPTION OF THE DREWINGS

DETAILED DESCRIPTION

The following provides an illustrated description of a practical example of the invention.

Figure 1:
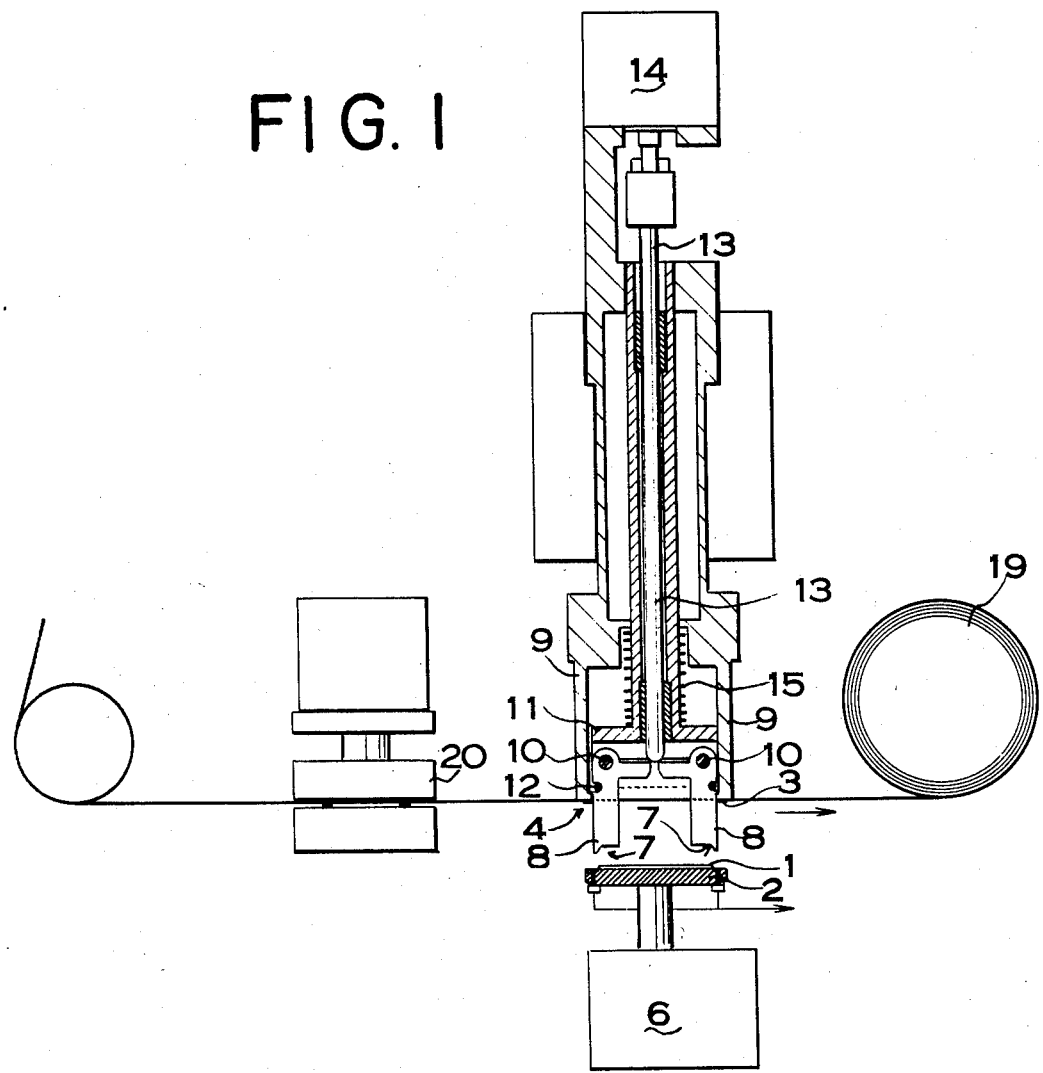
FIG. 1 is an abbreviated cross sectional view of this invention which is an apparatus for fabricating computer disks.
Figure 2:
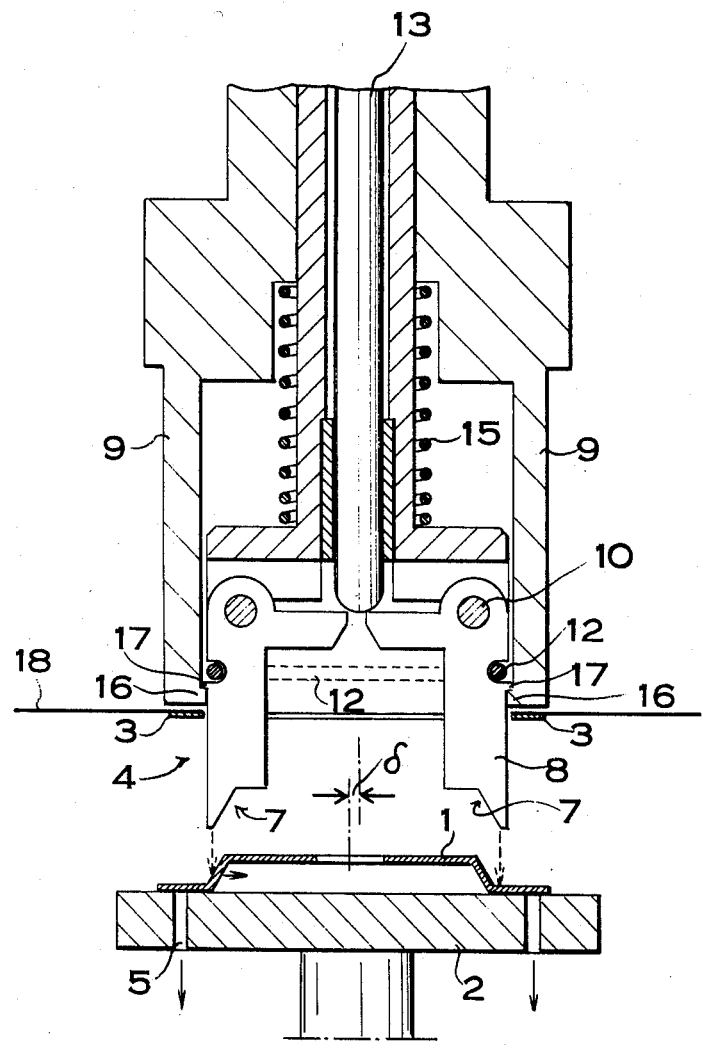
FIG. 2 is an enlarged sectional view of the principal parts of FIG. 1.

The computer disk fabricating apparatus shown in FIG. 1 and FIG. 2 is made up of a hub stand 2, which holds the hub 1 with suction in position on the upper surface of that stand, a centering device 4 located above the hub stand, which supports the disk 3, and means for transferring that disk.

As shown in FIG. 2, air holes 5, for holding the hub 1 in place are opened in the upper surface of the hub stand 2. These air holes 5 are connected by means of hosing to a vacuum system (not illustrated).

This hub stand 2 is connected to a vertical movement cylinder 6 for raising the stand when the disk and hub are to be attached.

The hub 1 is moved to a fixed position on the upper surface of the hub stand 2 by a delivery system (not illustrated).

The hub stand 2 is raised such that the hub 1 inserts into and aligns with the recession 7 in the tip of the centering device 4. At this time the hub 1 is allowed some horizontal play, and is not firmly held in an immovable state.

Although it is not illustrated, once the hub 1 has mated to some degree with the centering device 4, even if lateral movement of either the hub stand 2 or the centering device 4 is allowed, insertion of the hub 1 into the centering device 4 can be completed. Thus a construction allowing some play in either the hub stand 2 or the centering device 4 is recommended. For example, either the stand 2 or the centering device 4 can be supported through a flexible material.

The hub 1 is normally press formed from sheet metal. Hence, it is also possible to hold the hub in position with a magnet(s) instead of with a vacuum.

The centering device 4 is equipped with expandable arms 8 which pass through the center hole of the disk 3, and a cylindrical press 9 which surrounds the expandable arms 8.

As shown in FIG. 1 and FIG. 2, the expandable arms 8 have an overall L shape, and a tip with a recessed inner edge 7 such that the hub 1 can insert into the recession. Each arm 8 is installed on the body 11 of the centering device 4 by means of a pin 10. The arms 8 pivot around the pins 10 and are free to rotate to some extent in the vertical plane, thus allowing the arm tips to be squeezed together.

The outer edge of the arms 8 are grooved for the insertion of a tension spring 12 which squeezes the arms together. Pressure is applied to the center of the expandable arm assembly 8 by means of a rod 13 connected to a pressure cylinder 14.

Figure 3:
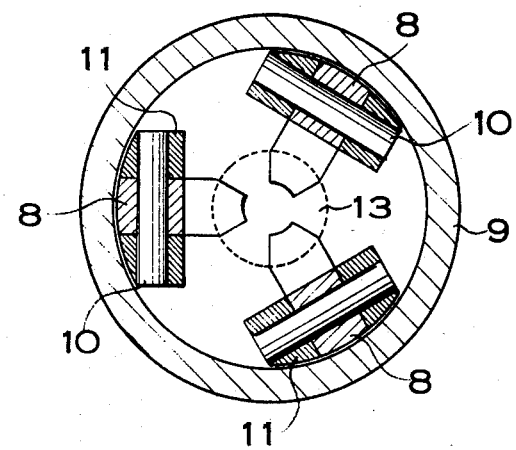
FIG. 3 is a horizontal slice cross sectional view of the expandable arm assembly illustrated in FIG. 2.

Further, as shown in the cutaway view of FIG. 3, three expandable arms 8 are arranged in a radial pattern to accurately position the center hole of the disk 3.

The expandable arms 8 and the body 11 of the centering device 4 are free to move vertically with respect to the cylindrical press 9, to allow the attachment of the disk 3 to the hub 1 when it is raised into position by the hub stand 2.

A compression coil spring 15 is installed between the centering device body 11 and the cylindrical press 9 to provide spring loaded pressure between those parts.

As shown in FIG. 2, a retaining flange 16 is machined on the inside of the tip of the cylindrical press 9, which mates with flanges 17 on the expandable arms 8, to prevent the compression spring 15 from pushing the expandable arms 8 and the centering device body 11 out of position.

As shown in FIG. 1, for a centering device 4 with this construction, when pressure is applied to the center of the expandable arm assembly 8 by the pressure cylinder 14 acting through the rod 13, the arms 8 expand and closely mate with the inside edge of the disk 3. Conversely, when the pressrue cylinder rod 13 is withdrawn, the expandable arms 8 are squeezed together by the tension spring 12.

The expandable arms 8 and the centering device body 11 are pushed up from beneath by the hub stand 2. When this occurs, the rod 13 which is connected to the pressure cylinder 14 is also pushed up together with the arms 8 and the centering device body 11. For this reason an air cylinder is used as the pressure cylinder 14. This provides a fixed pressure on the expandable arms 8 independent of the rod 13 position, and thus maintains the arms 8 in the expanded position.

The disk delivery system may be any system which can deliver the disks 3 one after another to a given fixed position. However, in the case where the disks 3 are disks of double sided tape, the most convenient disk delivery system is as illustrated in FIG. 1. This delivery system is comprised of a long contact sheet 18, which moves underneath the cylindrical press 9, and is taken up by the wind up reel 19. The double sided tape disks 3 are attached to the underside of the contact sheet 18.

A contact sheet clamp 20 is provided to temporarily stop the contact sheet 18, and hold it in place such that the expandable arm assembly 8 is inserted in the center hole of the disk 3.

The contact sheet clamp 20 temporarily stops the contact sheet 18 movement on the delivery side, while the wind up reel 19 pulls on the sheet from the other side stopping it with a uniform tension.

Figure 4:
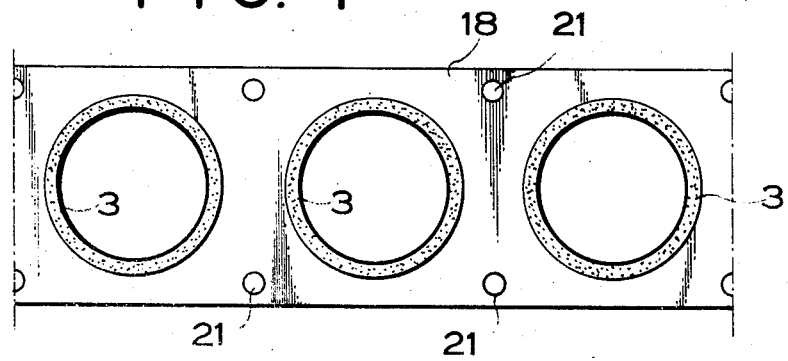
FIG. 4 is a view from above of the contact sheet with disks attached.
Figure 5:
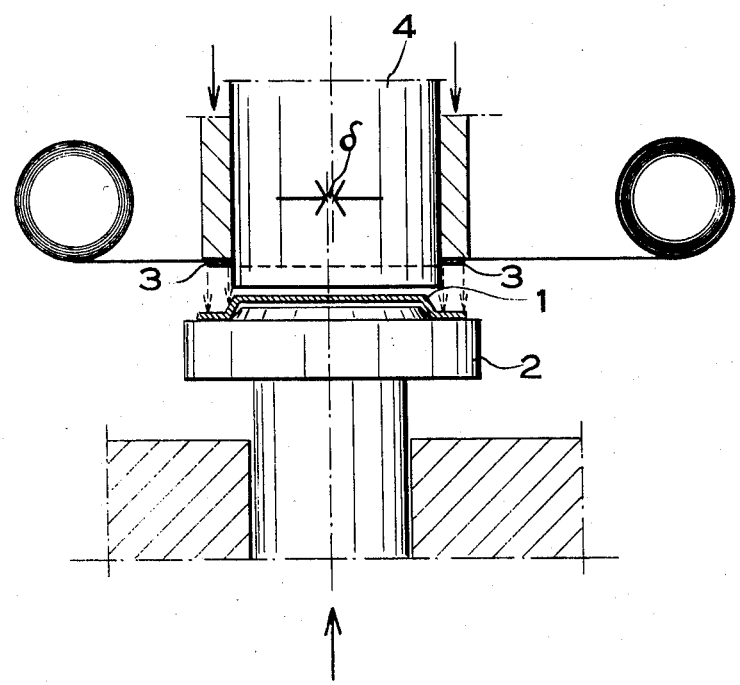
FIG. 5 is an enlarged cross sectional view of the principal parts of an existing apparatus for fabricating computer disks.

As shown in FIG. 4, The contact sheet 18 has an opening coincident with the center hole of the disk 3, as well as alignment holes 21 spaced at fixed intervals along both edges.

The wind up reel 19 feeds the contact sheet 18 with next disk 3 into position under the centering device 4, after the previous disk 3 has been attached to a hub 1.

The wind up reel 19 accurately delivers successive disks 3 into position under the centering device 4 by detecting alignment hole 21 position with a sensor (not illustrated).

While the contact sheet 18 is being moved, the expandable arm assembly 8 is withdrawn from the disk 3 center hole, and the centering device 4 is raised together with the cylindrical press 9 above, and clear of the contact sheet 18.

For the case where the disk is a computer memory disk rather than double sided tape, a delivery system which places disks one by one under the centering device is employed, instead of a continuous contact sheet delivery system.

For this case, the disk is held in position by the expandable arm assembly which inserts into, and expands to mate with the disk center hole. Furthermore, a system which delivers the disk to a position other than directly above the hub stand may also be used. In such a system, the expandable arm assembly inserts into and holds the disk, and then carries the disk to a position directly above the hub stand.

OPERATION OF THE APPARATUS (1) With the cylindrical press 9 and the centering device 4 in the raised position, and the hub stand 2 in the lowered position, the contact sheet is wound up. The contact sheet 18 is stopped with the disk 3 in a position close to directly over the hub stand 2 by the contact sheet clamp 20. The hub 1 is delivered to, and held in a position close to the center of the top surface of the hub stand.

(2) With the rod 13 withdrawn by the pressure cylinder 14, and the tip of the expandable arm assembly 8 in a squeezed together state, the centering device 4 and the cylindrical press 9 are lowered as a unit. The expandable arm assembly 8 inserts into the disk 3 center hole, and the bottom edge of the cylindrical press 9 comes in contact with the contact sheet 18. The pressure cylinder 14 then pushes the rod 13 causing the expandable arm to expand and mate closely with the disk 3 center hole.

(3) The hub stand 2 is raised such that the hub 1 mates with the recession in the tip of the expandable arm assembly 8. In this way the incremental error (s) between the center axes of the expandable arm assembly 8 and the hub 1 is mechanically corrected, and the hub 1 and disk 3 are accurately aligned. With continued raising of the hub stand 2, the expandable arm assembly is pushed up the by the hub 1, and the first outer perimeter portion of the hub 1 pushes up on, and attaches to the disk 3.

(4) The hub stand 2 is lowered while the cylindrical press 9 and the centering device 4 are raised, and the disk 3 which has attached to the hub 1 is peeled from the contact sheet 18 and is lowered with the hub 1. During this time the hub 1 is held attached to the hub stand 2. Subsequently, the hub 1 with the attached disk 3 is taken off the hub stand 2, and a new hub is delivered onto the hub stand 2. The contact sheet clamp 20 is released, and the contact sheet 18 delivers the next disk. This process is repeated and one by one disks are attached to hubs.

This invention, which is an apparatus for fabricating computer disks, attaches a disk to a hub while the convex center region of the hub, held in position by a hub stand, is inserted into a recession in the tip of a centering device, which is inserted in the center hole of the disk. The unique construction of the centering device corrects misalignment and provides for accurate attachment of the hub and disk even if the hub and disk are delivered slightly out of position. In particular, each time a hub and disk are attached, any hub to disk misalignment is corrected, and consistent hub to disk attachment accuracy is effectively realized.

What is claimed is:

1. an apparatus for fabricating computer disks, which comprises: a stand to hold a hub having a convex center region, a means for aligning a disk having a center hole, and a means for bringing the disk aligning means, while maintaining said disk in the aligned position, together relative to said stand, and attaching said disk to the perimeter of said hub; which is characterized in that the disk aligning means comprises a centering device, which maintains said disk in a fixed position by passing through the disk center hole and closely mating with the disk's inside edge, and a recessed region in the tip of said centering device which mates with the convex center region of said hub, such that the convex center region of said hub mechanically aligns with the recessed region in the tip of said centering device as said centering device and said stand are brought together.

2. An apparatus for fabricating computer disks as claimed in claim 1 in which the contact surface of said stand is equipped with air suction holes for holding said hub in place with suction.

3. An apparatus for fabricating computer disks as claimed in claim 1 in which said stand and said centering device both have up and down movement.

4. An apparatus for fabricating computer disks as claimed in claim 1 in which said centering device is an assembly of expandable arms which passes through said disk center hole and expands to closely mate with the inside edge of said disk.

* * * * *